Patented Nov. 6, 1945

2,388,285

UNITED STATES PATENT OFFICE 2,388,285

TEXTILE PRINTING WITH LEUCO ESTER SALTS OF VAT DYES

Roger Ratti, Neu-Allschwil, near Basel, and Philipp Brandt, Basel, Switzerland, assignors to Durand & Huguenin A. G., Basel, Switzerland No Drawing. Application March 27, 1942, Serial No. 436,530. In Switzerland April 2, 1941

7 Claims. (Cl. 8—70)

This invention relates to the preparation of dyestuff compositions for printing and dyeing textile fibers. The said compositions are characterized, on the one hand, by a content of acid ester compounds of enolic cyclic polyketones with polybasic acids and, on the other hand, by a content of substances which have a dispersing, i. e. dissolving, action on the said ester compounds. The latter which are hereinafter designated as "enolic ester compounds" are convertible, by acid oxidation, into dyestuffs. More particularly it relates to dyestuff compositions, containing as substances having a dispersing i. e. dissolving action on the enolic ester compounds, onium compounds containing at least one solubilizing group. Still more particularly it relates to dyestuff compositions containing sulphuric acid ester salts of leuco vat dyestuffs, especially alkali salts of the said sulfuric acid esters of the said dyestuffs, and onium compounds containing at least one solubilizing group. Still more particularly it relates to dyestuff compositions containing difficultly soluble to insoluble sulphuric acid ester salts of leuco vat dyestuffs and onium compounds containing at least one solubilizing group. Further still more particularly it relates to printing compositions especially adapted for the application of enolic ester compounds and to processes for printing and dyeing textile fibres with those printing compositions.

The enolic ester compounds present in the dyestuff compositions may be derived from dyestuffs or dyestuff intermediate products. Enolic ester compounds which are derived from the various series of vat dyestuffs (indigoids, thioindigoids and all vat dyestuffs containing the anthraquinone nucleus system) are of particular value, and the ester compounds may be derived from various reduction products of one and the same dyestuff. It may be stated that enolic ester compounds which are not derived from a vat dyestuff, but from an intermediate product, and from which a vat dyestuff is obtainable by oxidation (as for instance 2-aminoanthraquinone) are also included.

Polycarboxylic acids suitable for the esterification of the enolic cyclic polyketones are for example: malonic acid, phthalic acid, meta-sulphobenzoic acid, phosphoric acid and sulphuric acid. Preparations of great value are obtained from acid sulphuric acid ester compounds of leuco vat dyestuffs, especially in form of their alkali salts, obtainable in stable powder form by known methods.

The printing of textile materials with salts of acid sulphuric acid esters of leuco vat dyestuffs, known in the trade as "Indigosols," "Algosols," "Soledones" and so on, is a known art. In order to obtain with leuco ester salts even prints with good penetration into the fibre materials, showing optimum dyeing power and brilliancy, it is necessary that in the prepared printing compositions the ester salts are present in form of a suitable dispersion. Quite generally first the leuco ester salt must be dissolved in the printing paste. In order to obtain deep shades a quantity of ester salt, corresponding to 2-3 parts of vat dyestuff of 100% strength per 100 parts of printing paste, must be dissolved. A number of ester salts dissolve in these concentrations if necessary in the presence of a commonly used solvent only at elevated temperature, but remain dissolved, when again cooling the solution.

Many other leuco ester salts, amongst them some of the most valuable ones which yield prints of beautiful shades and excellent fastness properties, do not show this relatively good solubility. Some of them dissolve at elevated temperature, but partly precipitate again on cooling, even in the presence of a solvent. Still other ester salts dissolve even at elevated temperature only to a small extent. When cooling the printing colors, the dissolved portion precipitates again partly or completely. Another difficulty may also arise with cold printing colors, containing the ester salt in solution, when adding to such a color the oxidizing agent i. e. the acid yielding substance, required for the development. In some cases suddenly, in others on standing, the ester salt precipitates, whereby often large crystals of the leuco ester salt are formed. This is explainable by the fact that the leuco ester salts are salts of a strong acid and a strong base, being highly dissociated in aqueous solution. Hence they are sensitive toward other electrolytes and can, therefore, be salted out. In most cases a printing color containing the ester salt in a precipitated state becomes useless for printing purposes, because such a color blocks the engraving of the printing roller or because it contains the ester salt in form of differently sized particles or in form of large crystals, thus preventing the production of even prints.

It is now an object of this invention to provide improved dyestuff compositions, containing the enolic ester compounds, especially the ester salts of leuco vat dyestuffs in an optimal degree of dispersion suitable for printing and dyeing. It is a further object to provide dyestuff compositions containing the difficultly soluble to insoluble ester salts of leuco vat dyestuffs in an optimal degree of dispersion suitable for printing and dyeing. It is still a further object to provide printing and dyeing compositions, containing the leuco ester salts precipitated in a most finely divided form, whereby the precipitated ester salts are present in form of particles of as nearly as possible the same size. It is still a further object of the invention to provide printing and dyeing compositions containing the leuco ester salts dissolved in the printing color. Moreover, a further object of the invention consists in providing printing compositions containing the ester salts, besides a suitable oxidizing agent and optionally besides an acid yielding substance, in an optimal degree of dispersion suitable for printing. Finally, a still further object is to provide prints and dyeings on fabrics, distinguished by their evenness, their brilliancy of the shades and by a maximum of dyeing power.

These and other objects are accomplished by incorporating into an enolic ester compound composition, an onium compound, containing at least one solubilizing group.

Suitable compounds for the manufacture of the dyestuff preparations are quaternary ammonium- and phosphonium- or ternary sulphonium compounds, on the condition, that such a compound carries at least one solubilizing group. Solubilizing groups are for instance the hydroxy, the carboxylic and the sulpho group. In the quaternary or ternary onium compounds, these solubilizing groups must not be linked ionogenically, with the exception of those cases, wherein such a solubilizing, not ionogenically linked carboxylic- or sulpho group itself saturates, on forming an inner anhydride, the ionogen valence of the onium atom. An onium compound may contain side by side more than one solubilizing group of a different type. The sulpho group may be linked directly to carbon or it can be present in a state of one-sided esterification. The quaternary or ternary onium compound may contain aliphatic, aromatic, hydroaromatic and mixed aliphatic aromatic radicals. The onium atom may form (as far as possible) part of a heterocyclic nucleus, which besides this hetero-atom may contain other hetero- atoms. Every one of these aliphatic, aromatic, hydroaromatic and mixed aliphatic aromatic radicals may be composed of different organic radicals, linked amongst themselves not only directly by carbon, but also by "bridges" such as O, S, NH, NH—CO, NH—SO$_2$ and others. Onium compounds, containing one or more poly-ether radicals, such as are obtained easily by the action of an alkylene oxide on suitable compounds, containing a reactive hydrogen atom, have been found most valuable.

The molecule of such an onium compound may contain one or more nitrogen, phosphorus, or sulphur atoms. Only one or more of these atoms in the molecule of a compound may be present in the onium form.

For the manufacture of the dyestuff preparations also mixtures of the different onium compounds may be used.

In the sense of the above statements, amongst others, the following onium compounds have been found suitable:

Ammonium compounds, such as obtained for instance by quaternizing tertiary alkylolamines or mixtures of alkylolamines by means of methylchloride, dimethylsulphate and other quaternizing agents, the reaction products of alkylene oxide with salts of tertiary amines or alkylolamines and further N-hydroxyalkylpyridinium compounds.

Especially good results are obtained with quaternary ammonium compounds, containing besides a solubilizing group of the above described type, one or more ether-like oxygen bridges, such as resulting from the action of alkylene oxides on suitable amines, containing reactive hydrogen atoms, for instance the product obtained by quaternizing the trihydroxy-polyethylether of triethanolamine, the product resulting from the action of alkylene oxides on salts of the trihydroxy-ethylether of triethanolamine, the compound resulting from quaternizing the reaction product of one or more molecules of alkylene oxide with dihydroxydiethylaniline, or substitution products of the latter, the reaction product of one or more molecules of alkylene oxide with hydroxyalkyl-pyridinium compounds.

Other interesting products are the quaternary ammonium compounds, containing as solubilizing groups carboxylic or sulpho groups, such as for instance trialkylphenyl - ammonium - sulphonic acid anhydride, dialkylbenzylphenylammonium-mono- and disulphonic acids, the latter in form of suitable salts, trimethylglycinemethylsulphonate or compounds, corresponding to the type of betain and others.

Good results are further obtained with quaternary ammonium compounds, containing the residue of urea.

According to the present invention, the dyestuff compositions can quite generally be prepared by mixing enol ester compounds with quaternary or ternary onium compounds of the above defined type, optionally in the presence of a suitable liquid diluting agent. A simple and practical form of preparation consists in mixing a salt of an enol ester compound with a salt of an onium compound, in substance or in the presence of water. Besides, all the means leading according to the known general methods to a partial to complete formation of salts between the enolic ester compounds and the onium compounds, for instance by double transformation in a suitable solvent, such as water, may serve for the purpose of the invention.

In the new dyestuff preparations the above described onium compounds act as dispersing agents on the enol ester compounds in the presence of a suitable solvent. The degree of dispersion which may be attained depends on the properties of the enol ester compound, especially on its solubility, on the nature and on the quantity of the applied onium compounds and also on the presence of other ingredients. The degree of dispersion may vary from the molecular dispersion phase to a complete precipitation of the enol ester compound in finely divided form.

By suitable selecting the onium compound and proper dosage of the amount to be added to the dyestuff preparation, the degree of dispersion of the various enol ester compounds can be adjusted in such a way that for one and the same ester compound and for the selected application i. e. developing method, the highest degree of dispersion, yielding in printing and dyeing on textile material a maximum yield in dyeing power is obtained.

The new preparations represent a valuable improvement in printing and dyeing with enol ester compounds. Especially the difficultly soluble, hitherto not or only difficultly applicable alkali ester salts of certain enol ester compounds may now in form of the new preparations advantageously be used for printing.

The present invention will be further described in connection with the following specific examples, in which the parts are by weight and which are given in order to illustrate this invention. It will be realized, however, that the present invention is not limited thereto, but that changes may be made in the dyestuffs and ingredients and their proportions, manipulation steps and other conditions, without departing from the scope of the appended claims.

*Example 1*

The following printing preparation is made up:
40 parts of the sodium salt of the acid sulphuric acid ester of leuco-2:1-6:5-anthraquinone-diphenylthiazol, corresponding to 50 per cent of vat dyestuff are dissolved in the heat with 210 parts of water, 150 parts of the methylsulphonate of methyltriethanolammonium and 500 parts of a neutral starch tragacanth thickening. To the warm solution are added, whilst stirring, 40 parts of a solution of ammonium thiocyanate (50%) and 50 parts of a solution of sodium chlorate (25%), whereby the ester salt begins to precipitate in finely divided form. The mixture is cooled down to room-temperature and then 10 parts of a solution of ammonium vanadate (1%) are added.

Cotton is printed with the thus prepared composition, dried and steamed for 8 or twice for 8 minutes in a Mather-Platt apparatus. After the usual soaping at the boil, a vivid and pure canary-yellow print is obtained.

In the above example the 150 parts of the methylsulphonate of methyltriethanolammonium may be replaced by the following salts with substantially the same results: 100 parts of the addition product of 2 mol. of dimethylsulphate on 1 mol. of the tetrahydroxypolyethyl ether obtained by the reaction of 8 mol. of ethylene oxide on tetraethanolethylene diamine, or by 100 parts of the hydroxyethyl ether of hydroxyethyl-pyridinium chloride, or by 100 parts of tetraethanolammonium chloride, or by 80 parts of the addition product of 1 mol. of dimethyl sulphate on 1 mol. of morpholine-N-hydroxyethyl ether, whereby the proportions of the water to be added must be changed accordingly.

*Example 2*

The following printing preparation is made up:
40 parts of the sodium salt of the acid sulphuric acid ester of leuco-2:1-6:5-anthraquinone-diphenylthiazol, corresponding to 50 per cent of vat dyestuff, are dissolved by warming, with 350 parts of water, 50 parts of the addition product of 1 mol. of dimethyl sulphate on 1 mol. of the trihydroxyethyl ether of triethanolamine and 500 parts of a neutral starch tragacanth thickening. The solution thus obtained is cooled down whilst stirring, whereby the ester salt precipitates partly in finely divided form. Afterwards 40 parts of a solution of sodium nitrite (30%) and 20 parts of solution of sodium carbonate (10%) are added, whereby the rest of the ester salt precipitates in extremely fine form.

When cotton is printed with this preparation and the print developed for 8 seconds at 70° C. in a sulphuric acid bath, containing 20 ccm. of concentrated sulphuric acid per liter, one obtains, after the usual washing and soaping at the boil, an even greenish-yellow print. When steaming the material for 4 minutes before the development, the depth of the shade can be intensified.

In this example the 50 parts of the addition product of 1 mol. of dimethyl sulphate on 1 mol. of the trihydroxyethylether of triethanolamine may be replaced by the following salts with substantially the same results: by 50 parts of the addition product of 1 mol. of methyl chloride on 1 mol. of the trihydroxyethyl ether of triethanolamine or by 50 parts of the addition product of 2 mol. of dimethyl sulphate on 1 mol. of the tetrahydroxypolyethyl ether, obtained by the reaction of 8 mol. of ethyleneoxide on tetraethanol-ethylene diamine, or by 70 parts of the addition product of 1 mol. of dimethyl sulphate on 1 mol. of the trihydroxypolyethylether of triethanolamine obtained by the reaction of 18 mol. of ethylene oxide on 1 mol. of triethanolamine, or by 20 parts of the addition product of 1 mol. of dimethyl sulphate on 1 mol. of piperidine-N-hydroxytriethyl ether, or by 20 parts of the hydroxyethyl ether of hydroxyethylpyridinium chloride, whereby the proportions of the water to be added must be changed accordingly. The application of the two last named products require a short steaming before development.

*Example 3*

50 parts of the sodium salt of the acid sulphuric acid ester of leuco-3:4-8:9-dibenzpyrenequinone, corresponding to 40% of vat dyestuff, are dissolved in the heat with 393 parts of water, 20 parts of the addition product of 1 mol. of methyl chloride on 1 mol. of the trihydroxy-ethyl ether of triethanolamine and 500 parts of a neutral starch tragacanth thickening. The solution is cooled down whilst stirring. Then are added 15 parts of an ammonium cyanate solution (50%), 16 parts of a sodium chlorate solution (25%) and 6 parts of a solution of ammonium vanadate (1%). There is obtained a preparation, which contains the ester salt in form of a fine division.

When cotton is printed with this preparation and the print developed as described in Example 1, there is obtained a vivid, golden-yellow print.

*Example 4*

The following printing preparation is made up:
50 parts of the acid sulphuric acid ester of leuco-3:4-8:9-dibenzpyrenequinone, corresponding to 40% of vat dyestuff, are dissolved in the heat with 380 parts of water, 20 parts of the addition product of 1 mol. of dimethyl sulphate on 1 mol. of the trihydroxyethyl ether of triethanolamine and 500 parts of a neutral starch tragacanth thickening. The solution is cooled down, whilst stirring. To the cold solution are added 30 parts of a solution of sodium nitrite (30%) and 20 parts of a solution of sodium carbonate (10%). There results a preparation, containing the ester salt in a dissolved state.

Cotton is printed with this preparation and treated as described in Example 2. There is obtained a vivid, deep, golden-yellow print.

In this example the 20 parts of the addition product of 1 mol. of dimethyl sulphate with 1 mol. of the trihydroxyethylether of triethanolamine may be replaced with substantially the same results, by 10 parts of the hydroxyethyl ether of hydroxyethylpyridinium chloride, whereby in the latter case, the prints must be submitted to a short steaming before the development.

Example 5

The following dyestuff preparation is made up:

40 parts of the sodium salt of the acid sulphuric acid ester of the leuco-2:1-naphthioindigo, corresponding to 50% of vat dyestuff, are dissolved in the heat with 380 parts of water and 50 parts of the addition product of 1 mol. of dimethyl sulphate on 1 mol. of the trihydroxyethyl ether of triethanolamine and 500 parts of a neutral starch tragacanth thickening. The solution is cooled down to 60° C. Afterwards are added, whilst stirring, 30 parts of a solution of sodium nitrite (30%). The mixture is further cooled, whereby the ester salt precipitates in finely divided form.

When cotton is printed with the thus obtained preparation and treated as described in Example 2, there is obtained a deep, even and vivid brown print.

Example 6

The following dyestuff preparation is made up:

40 parts of the sodium salt of the acid sulphuric acid ester of leuco-dibromo-anthanthrone, corresponding to 50% of vat dyestuff, are dissolved by heating with 310 parts of water, 100 parts of the addition product of 1 mol. of dimethyl sulphate on 1 mol. of the trihydroxyethyl-ether of triethanolamine and 500 parts of a neutral starch tragacanth thickening, and the solution thus obtained is cooled down whilst stirring. Then 30 parts of a solution of sodium nitrite (30%) and 20 parts of a solution of sodium carbonate (10%) are added. There results a preparation containing the ester salt in a dissolved state.

When cotton is printed with this preparation and treated as described in Example 2, there is obtained a bright, even and strong orange print.

In this example, the 100 parts of the quaternary addition product may be replaced with the same result by 80 parts of the addition product of 1 mol. of dimethyl sulphate on the mixture of the hydroxyethyl ethers of diethylaminoethanol, obtainable for example, by the action of 3 mol. of ethylene oxide on 1 mol. of diethylaminoethanol in a methylalcoholic solution.

Example 7

The following dyestuff preparation is made up:

60 parts of the sodium salt of the acid sulphuric acid ester of leuco-dibromo-3:4-8:9-dibenzpyrenquinone, corresponding to 30% of vat dyestuff, are dissolved by heating with 350 parts of water, 50 parts of the addition product of 1 mol. of dimethyl sulphate on 1 mol. of the trihydroxyethyl-ether of triethanolamine and 500 parts of a neutral starch tragacanth thickening, and the solution thus obtained is cooled down whilst stirring. Then 20 parts of a solution of ammonium thiocyanate (50%), 20 parts of a solution of sodium chlorate (25%) and 5 parts of a solution of ammonium vanadate (1%) are added. The dyestuff is precipitated in finely divided form.

When cotton is printed with this preparation and treated as described in Example 1, a bright, even gold-yellow print is obtained.

Example 8

The following dyestuff preparation is made up:

40 parts of the sodium salt of the acid sulphuric acid ester of leuco-dichloroanthanthrone, corresponding to 50% of vat dyestuff, are dissolved by heating with 310 parts of water, 100 parts of the addition product of diethyl sulphate on the trihydroxyethylether of triethanolamine and 500 parts of neutral starch tragacanth thickening and the solution thus obtained is cooled down whilst stirring. Then 30 parts of a sodium nitrite solution (30%) and 20 parts of a sodium carbonate solution (10%) are added. The dyestuff is precipitated in finely divided form.

When cotton is printed with this preparation, and treated as described in Example 2, a bright, even and strong orange print is obtained.

In this example, the 100 parts of the quaternary addition product may be replaced with the same result by 100 parts of N-($\beta,\gamma$-dioxypropyl-)pyridinium chloride or by 50 parts of oxyethylpyridinium chloride.

Example 9

The following dyestuff preparation is made up:

80 parts of the sodium salt of the acid sulphuric acid ester of leuco-4-methyl-6-chloro-6'-methoxythioindigo, corresponding to 25% of vat dyestuff, are dissolved by heating with 320 parts of water, 20 parts of the hydroxyethyl ether of hydroxyethylpyridinium chloride and 500 parts of a neutral starch tragacanth thickening, and the solution thus obtained is cooled down whilst stirring. Then 40 parts of a solution of ammonium thiocyanate (50%), 30 parts of a solution of sodium chlorate (25%) and 10 parts of a solution of ammonium vanadate (1%) are added. There results a preparation containing the dyestuff in solution.

When cotton is printed with this preparation and treated as described in Example 1, a strong, even, scarlet-red print is obtained.

Example 10

The following dyestuff preparation is made up:

80 parts of the potassium salt of the acid sulphuric acid ester of leuco-Bz-2, Bz-2'-dimethoxy-dibenzanthrone, corresponding to 25% of vat dyestuff, are dissolved by heating with 350 parts of water, 20 parts of the hydroxyethyl ether of hydroxyethylpyridinium chloride and 500 parts of a neutral starch tragacanth thickening, and the solution is cooled down. Then 30 parts of a solution of sodium nitrite (30%) and 20 parts of a solution of sodium carbonate (10%) are added. There results a preparation containing the dyestuff in solution.

When cotton is printed with this preparation and, after drying, steamed for 4 minutes and then treated as described in Example 2, a strong, even, well penetrated green print is obtained.

Example 11

The following dyestuff preparation is made up:

60 parts of the sodium salt of the acid sulphuric acid ester of leuco-6,6'-diethoxythioindigo, corresponding to 30% of vat dyestuff, are dissolved by heating with 320 parts of water, 40 parts of the hydroxyethyl ether of hydroxyethylpyridinium chloride and 500 parts of a neutral starch tragacanth thickening, and the solution thus obtained is cooled down whilst stirring. Then 40 parts of a solution of ammonium thiocyanate (50%), 30 parts of a solution of sodium chlorate (25%), and 10 parts of a solution of ammonium vanadate (1%) are added. A preparation is thus obtained, which contains the dyestuff precipitated in a finely divided form.

When cotton is printed with this preparation and treated as described in Example 1, an even and strong orange print is obtained.

Example 12

The following dyestuff preparation is made up:

40 parts of the sodium salt of the acid sulphuric acid ester of leuco-2:1-6:5-anthraquinone-diphenylthiazol, corresponding to 50% of vat dyestuff, are dissolved by heating with 390 parts of water, 10 parts of triethanol-sulphonium chloride and 500 parts of a neutral starch tragacanth thickening, and the solution is cooled down. Then 40 parts of a solution of sodium nitrite (30%) and 20 parts of a solution of sodium carbonate (10%) are added. A preparation is thus obtained which contains the dyestuff precipitated in a finely divided form.

When cotton is printed with this preparation, and, after drying, steamed for 4 minutes, and then treated as described in Example 2, a strong, even, yellow print is obtained.

Example 13

The following dyestuff preparation is made up:

40 parts of the sodium salt of the acid sulphuric acid ester of leuco dibromo-anthanthrone, corresponding to 50% of vat dyestuff, are dissolved by heating with 330 parts of water, 80 parts of triethanolsulphoniumchloride and 500 parts of a neutral starch tragacanth thickening and the solution thus obtained is cooled down whilst stirring. Then 30 parts of a solution of sodium nitrite (30%) and 20 parts of a solution of sodium carbonate (10%) are added. A preparation is thus obtained which contains the dyestuff in a finely divided form.

When cotton is printed with this preparation and after-treated as described in Example 2, a bright, even and strong orange print is obtained.

Example 14

The following dyestuff preparation is made up:

40 parts of the sodium salt of the acid sulphuric acid ester of leuco-2:1-6:5-anthraquinone-diphenylthiazol, corresponding to 50% of vat dyestuff, are dissolved by heating with 340 parts of water, 60 parts of the mono-sodium salt of dimethyl-phenyl-benzyl - ammonium - disulphonic acid and 500 parts of a neutral starch tragacanth thickening and the solution is cooled down. Then 40 parts of a solution of sodium nitrite (30%) and 20 parts of a solution of sodium carbonate (10%) are added. Thus a preparation is obtained which contains the dyestuff in a finely divided form.

When cotton is printed with this preparation and, after drying, steamed for 4 minutes and then after-treated as described in Example 2, a strong and even yellow print is obtained.

In this example the 60 parts of the mono-sodium salt of the ammonium-disulphonic acid may be replaced by 30 parts of the internal anhydride of trimethyl-phenyl-ammoniumsulphonic acid.

Example 15

The following dyestuff preparation is made up:

40 parts of the sodium salt of the acid sulphuric acid ester of leuco-2:1-6:5-anthraquinone-diphenylthiazol, corresponding to 50% of vat dyestuff, are dissolved by heating with 260 parts of water, 100 parts of the mono-diethylamine salt of dimethyl-phenyl-benzyl-ammonium disulphonic acid and 500 parts of a neutral starch tragacanth thickening, and the solution is cooled down. Then 40 parts of a solution of ammonium thiocyanate (50%), 50 parts of a solution of sodium chlorate (25%) and 10 parts of a solution of ammonium vanadate (1%) are added. A preparation is obtained, which contains the dyestuff precipitated in finely divided form.

When cotton is printed with this preparation and after-treated as described in Example 1, a strong, even, yellow print is obtained.

What we claim is:

1. A dyestuff composition for printing textile fibres, comprising an ester salt of a leuco vat dyestuff and a stable salt of a quaternary ammonium base containing as solubilizing group at least one substituent not ionogenically bound with the ammonium nitrogen atom, this substituent being a member of the class consisting of OH, COOH and $SO_3H$, said base being selected from the group consisting of the ammonium compounds obtained by quaternizing tertiary alkylolamines, the reaction products of alkylene oxide with salts of tertiary amines, the reaction products of alkylene oxide with salts of tertiary alkylolamines, and the reaction products of alkylene oxide with N-hydroxyethylpyridinium salts.

2. A dyestuff composition for printing textile fibres, comprising an ester salt of a leuco vat dyestuff and a stable salt of a quaternary ammonium base containing as solubilizing group at least one hydroxy group not ionogenically bound with the ammonium nitrogen atom, and further containing at least one ether-linked oxygen atom said base being selected from the group consisting of the ammonium compounds obtained by quaternizing tertiary alkylolamines containing an ether-linked oxygen atom, the reaction products of alkylene oxide with salts of tertiary amines, the reaction products of alkylene oxide with salts of tertiary alkylol amines, and the reaction products of alkylene oxide with N-hydroxyethyl-pyridinium salts.

3. A dyestuff composition for printing textile fibres, comprising a difficultly soluble ester salt of a leuco vat dyestuff and a stable quaternary ammonium compound as claimed in claim 1.

4. A dyestuff composition for printing textile fibres, comprising a difficultly soluble ester salt of a leuco vat dyestuff and a stable quaternary ammonium compound as claimed in claim 2.

5. A dyestuff composition for printing textile fibres, comprising a difficultly soluble ester salt of a leuco vat dyestuff and the trihydroxyethylether of methyltriethanol-ammonium-methylsulfonate.

6. A dyestuff composition for printing textile fibres, comprising a difcultly soluble ester salt of a leuco vat dyestuff and the hydroxyethylether of the hydroxyethyl-pyridinium-chloride.

7. A dyestuff composition for printing textile fibres, comprising the sodium salt of the acid sulfuric acid ester of leuco-2:1-6:5-anthraquinone-diphenyl-thiazol and the trihydroxyethyl ether of methyltriethanol - ammonium - methyl - sulfonate.

ROGER RATTI.
PHILIPP BRANDT.